(12) United States Patent
Kneisley et al.

(10) Patent No.: US 10,220,455 B2
(45) Date of Patent: Mar. 5, 2019

(54) SHEAR KNIFE

(71) Applicant: Andritz ASKO, INC., West Homestead, PA (US)

(72) Inventors: Joel D. Kneisley, Perry, OH (US); Menno Johan van der Woude, Oosthuizen (NL); Albert R. Zelt, III, Bethel Park, PA (US)

(73) Assignee: ANDRITZ ASKO INC., West Homestead, PA (US)

( * ) Notice: Subject to any disclaimer, the term of this patent is extended or adjusted under 35 U.S.C. 154(b) by 0 days.

(21) Appl. No.: 15/705,343

(22) Filed: Sep. 15, 2017

(65) Prior Publication Data

US 2018/0001401 A1 Jan. 4, 2018

Related U.S. Application Data

(63) Continuation of application No. 14/658,530, filed as application No. PCT/US2014/053220 on Aug. 28, 2014, now Pat. No. 9,789,551.

(60) Provisional application No. 61/872,076, filed on Aug. 30, 2013.

(51) Int. Cl.
*B23D 35/00* (2006.01)
*B26D 1/00* (2006.01)
*B24B 3/36* (2006.01)
*E02F 3/96* (2006.01)

(52) U.S. Cl.
CPC ............ *B23D 35/001* (2013.01); *B24B 3/361* (2013.01); *E02F 3/965* (2013.01)

(58) Field of Classification Search
CPC .............................. B23D 35/001; B24B 3/361
See application file for complete search history.

(56) References Cited

U.S. PATENT DOCUMENTS

| | | |
|---|---|---|
| 327,107 A | 9/1885 | Polsey et al. |
| 706,013 A | 8/1902 | Boyce |
| 1,123,532 A | 1/1915 | Heynau |
| 1,129,980 A | 3/1915 | Heynau |
| 1,682,900 A | 2/1926 | Frick |
| 1,701,919 A | 2/1929 | Grumpelt |
| 1,996,306 A | 4/1935 | Rebens |

(Continued)

FOREIGN PATENT DOCUMENTS

| | | |
|---|---|---|
| DE | 3635991 | 4/1988 |
| DE | 4119813 | 12/1992 |

(Continued)

OTHER PUBLICATIONS

Yiğit Karpat, "Investigation of the Effect of Cutting Tool Edge Radius on Material Separation Due to Ductile Fracture in Machining", International Journal of Mechanical Sciences 51. 2009. pp. 541-546. Entire Document.

(Continued)

*Primary Examiner* — Omar Flores Sanchez
(74) *Attorney, Agent, or Firm* — Robert Joseph Hornung

(57) ABSTRACT

A metal shearing tool demonstrating improved fatigue life having a body; an edge of the body having a first surface and a second surface; a cutting surface disposed between the first surface and the second surface. The edge has a substantial absence of finish marks substantially parallel with the cutting surface on all surfaces of the edge, and at least one of a curved profile surface and a radiused cutting surface.

6 Claims, 4 Drawing Sheets

(56) References Cited

U.S. PATENT DOCUMENTS

| | | | |
|---|---|---|---|
| 3,776,072 | A | 12/1973 | Gerber et al. |
| 3,955,446 | A | 5/1976 | Mundy |
| 4,233,871 | A | 11/1980 | Alessi |
| 4,533,812 | A | 8/1985 | Lorenz |
| 4,942,798 | A | 7/1990 | Taub et al. |
| 5,299,892 | A | 4/1994 | Pickert |
| 6,085,624 | A | 7/2000 | Lever et al. |
| 6,272,962 | B1 | 8/2001 | Yasoda et al. |
| 6,976,414 | B2 | 12/2005 | Li et al. |
| D559,638 | S | 1/2008 | Park |
| 7,455,004 | B2 | 11/2008 | Li et al. |
| 7,476,064 | B2 | 1/2009 | Ishii |
| 2004/0093739 | A1* | 5/2004 | Jacobson ............... B23D 17/00 30/134 |
| 2015/0308075 | A1* | 10/2015 | Christenson .......... E02F 9/2883 30/134 |

FOREIGN PATENT DOCUMENTS

| | | |
|---|---|---|
| EP | 2402476 | 1/2012 |
| WO | 2015170707 | 11/2015 |

OTHER PUBLICATIONS

International Search Report and Written Opinion for corresponding International Application No. PCT/US14/053220 dated Dec. 23, 2014.

European Search Report for European Application No. 14839708.6 dated Feb. 10, 2017.

* cited by examiner

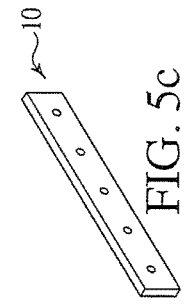
FIG. 5a
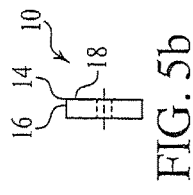
FIG. 5b
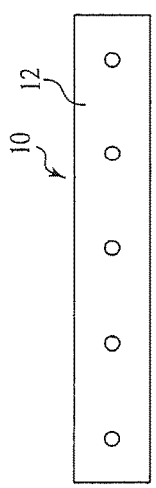
FIG. 5c
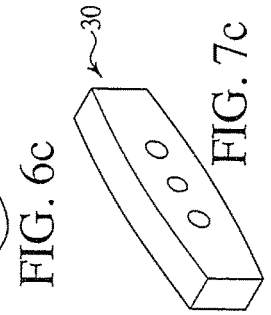
FIG. 6a
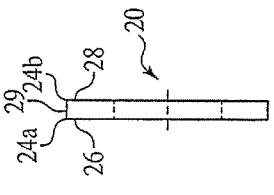
FIG. 6b
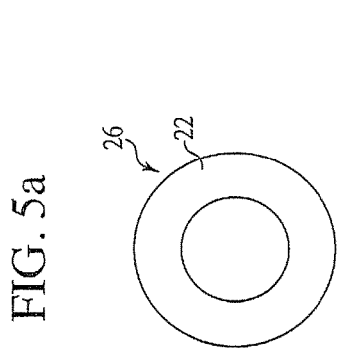
FIG. 6c
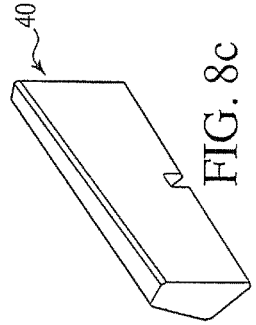
FIG. 7a
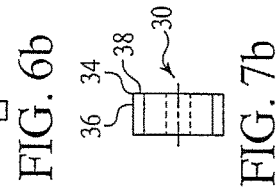
FIG. 7b
FIG. 7c
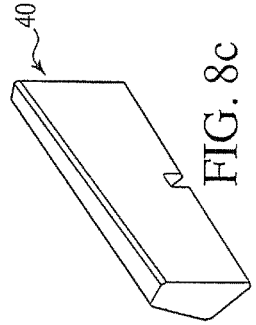
FIG. 8a
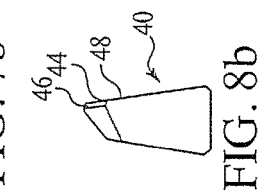
FIG. 8b
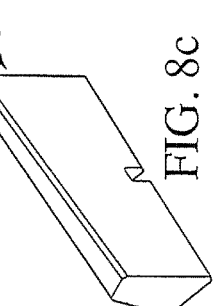
FIG. 8c

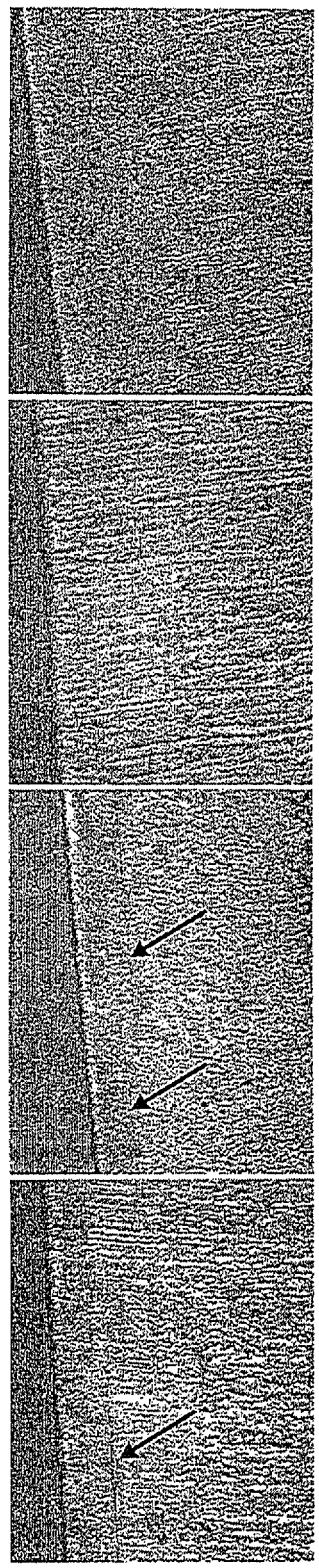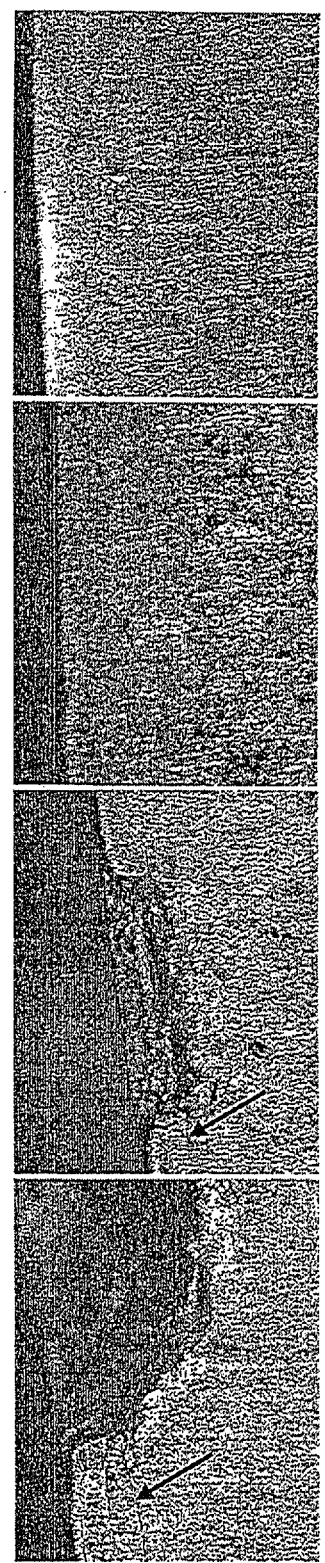

SHEAR KNIFE

CROSS-REFERENCE TO RELATED APPLICATIONS

This application is a continuation application of U.S. patent application Ser. No. 14/658,530 filed on Mar. 16, 2015, which is a national phase application pursuant to 35 U.S.C. § 371 of International Application No. PCT/US2014/053220, filed on Aug. 28, 2014, which itself claims the benefit under 35 U.S.C. 119 § (e) of the earlier filing date of U.S. Provisional Patent Application No. 61/872,076, filed on Aug. 30, 2013, the entire contents of which are incorporated herein by reference.

BACKGROUND

This application discloses an invention which is related, generally and in various embodiments, to metal shearing knives or tools and their edges. Metal shearing knives or tools include shearing knives or any tool which separates metal. Metal shearing knives are made in a number of configurations, including but not limited to: straight, with one to four straight shearing edges; rotary, with one or two circular shearing edges; curved, with one to four curvilinear shearing edges; and helical, typically with one compound curved shearing edge.

When shearing low to mid-strength metals, i.e. less than approximately 500 MPa tensile strength, edges of shear knives typically reach end of life when the edge gets dull (worn) and are no longer able to shear the metal and provide the desired sheared edge quality. Dull knife edges typically produce undesirable burr on the sheared edge.

Abrasive wear of the knife edge, as it moves through the metal being sheared, wears the originally sharp edge to a dull edge. When the edges of a knife becomes too dull/worn to produce the desired quality of sheared edge, the shear knife edge typically is resharpened by grinding or machining to remove knife material from one or both of the two surfaces that intersect and form the knife edge.

Examples of prior art knife edges are shown in FIGS. 1-4. FIG. 1 shows a prior art knife edge 100 of a conventional metal shearing knife. Prior art knife edge 100 has a cutting surface 102 disposed between two surfaces 104, 106. In this illustration, the surfaces 104, 106 are portions of a first face/outside diameter 108 and a second face 110. Prior art knife edge 100 has a ground surface finish with surface finish marks 112 substantially parallel with cutting surface 102.

FIG. 2 shows a prior art knife edge 200 of a conventional rotary knife. Prior art knife edge 200 has a cutting surface 202 disposed between two surfaces 204, 206. In this illustration, the surfaces 204, 206 are portions of an outside diameter 208 and a face 210. Surface 204 of outside diameter 208 has surface finish marks 212a substantially parallel with cutting surface 202. Surface 206 of face 210 is lapped with non-directional surface finish marks 212b.

FIG. 3 shows a prior art knife edge 300 of a conventional straight knife. Prior art knife edge 300 has a cutting surface 302 disposed between two surfaces 304, 306. In this illustration, the surfaces 304, 306 are portions of a first face 308 and a second face 310. The surfaces 304, 306 have a ground surface finish created by a vertical spindle grinder grinding wheel with surface finish marks 312 at a bias to the cutting surface 302.

FIG. 4 shows a prior art knife edge 400 of a conventional rotary knife. Prior art knife edge 400 has a radiused cutting surface 402 disposed between two surfaces 404, 406. In this illustration, the surfaces 404, 406 are portions of outside diameter 408 and face 410. Surfaces 404, 406 blend with radiused cutting surface 402, and a single-point machined surface finish with surface finish marks 412 substantially parallel with cutting surface 402 on surfaces 404, 406 of the outside diameter 408 and face 410, and on cutting surface 402.

Abrasive wear rates of shear knife edges can be reduced by selection of knife metallurgy (material composition, heat treatment, and hardness) to produce harder, more wear-resistant knife edges that slow the rate of wear and prolong edge life.

In the 1960's, researchers began developing higher strength steels for military and specialty applications. Since that time, higher and higher strength steels have been developed and produced. HSLA steels (High Strength Low Alloy) and AHSS (Advanced High Strength Steels) are commonly used to achieve lower weight, higher strength, and lower cost products, such as automobiles, pipe, tube, structures, and fabrications. These higher strength steels have tensile strengths well above 500 MPa, to as high as 1600 MPa in current production, and to over 2000 MPa under development.

A problem associated with shearing these higher strength steels is the early failure of shear knife edges by fracturing. Higher strength steels, with 2 times to 4 times the tensile strengths of low to mid-strength steels, cause edges of conventional knives to fail by pieces breaking out of the knife edges at rates 5 to 10 times greater than dulling by abrasive wear.

The accelerated failure of the shear knife edges is due to high contact stresses in the knife edges resulting from the higher forces required to shear the high strength steel. The higher stresses in the knife edges cause fatigue fractures to start earlier and to propagate faster, until edge spalling occurs. The higher the tensile strength and thickness of the metal being sheared, the higher the stress in the knife edges and the faster the edges fail. 'Fatigue life' related to metal shearing knives is a relative property of a knife edge compared with another knife edge, when the edges are run under similar conditions, shearing the same or similar material (grade, strength, and thickness). If a knife edge fails due to fatigue cracks developing and propagating until a piece of the knife edge breaks out of the knife, producing an unacceptable condition of the sheared edge of the material being sheared, the fatigue life of that knife edge is considered to be lower than a knife edge shearing the same material without failing in this manner. When comparing the fatigue life of different objects, typically the length of a run until failure is measured. Different steel mills record length of run in different units, such as: million feet (MFT) of lineal coil length; kilometers (km) of lineal coil length; number of coils, tons, number of work shifts, hours.

Attempts to reduce the rate of fatigue failure, using knives made from tougher grades of tool steel, have had mixed success, ranging from 20% to 30% longer life to equal or sometimes lower life. These tests do not indicate significant, repeatable increase of fatigue life by using this approach.

BRIEF DESCRIPTION OF THE DRAWINGS

FIGS. 5a, 5b and 5c show front, side and perspective views of a knife having straight edges according to an embodiment of the invention.

FIGS. 6a, 6b and 6c show front, side and perspective views of a knife having rotary edges according to an embodiment of the invention.

FIGS. 7a, 7b and 7c show front, side and perspective views of a knife having curved edges according to an embodiment of the invention.

FIGS. 8a, 8b and 8c show front, side and perspective views of a knife having a helical edge according to an embodiment of the invention.

FIGS. 13a and 13b show 40× magnification microscope photographs of best conditions of prior art type edges after test run.

FIGS. 13c and 13d show 40× magnification microscope photographs of worst conditions of same prior art type edges after same test run.

FIGS. 14a and 14b show 40× magnification microscope photographs of best conditions of edges of embodiments of the invention after same test run.

FIGS. 14c and 14d show 40× magnification microscope photographs of worst conditions of same edges of embodiments of the invention after same test run.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 9:
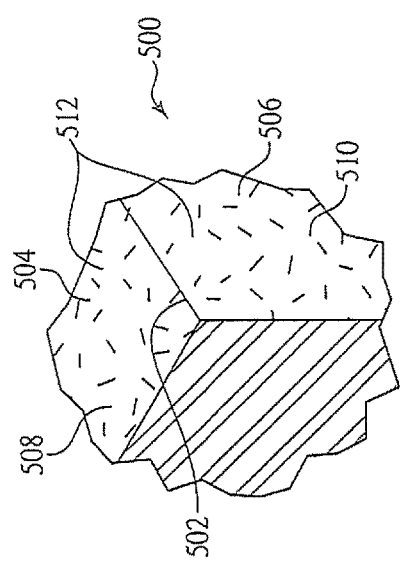
FIG. 9 shows a partial perspective view of a knife edge having a cutting surface disposed between surfaces of faces or face/outside diameter, all surfaces with non-directional surface finishes (isotropic, lapped, polished, burnished, peened, blasted) according to an embodiment of the invention.

With reference to FIGS. 5a to 12, embodiments of the invention provide for increased fatigue life by treating the edge of a metal shearing knife or tool to include features related to absence or direction of finish marks, radiused cutting surface, and curved profile surface. Specifically, and as illustrated in FIGS. 9-12, the features include: a substantial absence of finish marks that are substantially parallel with a cutting surface; radiused cutting surface; and curved profile surface. FIG. 9 shows a knife edge 500 of a metal shearing knife according to an embodiment of the invention. Knife edge 500 has a cutting surface 502 disposed between two surfaces 504, 506. Surfaces 504, 506 are portions of a first face/outside diameter 508 and a second face 510 having non-directional surface finishes 512 (isotropic, lapped, polished, burnished, peened, blasted).

Figure 10:
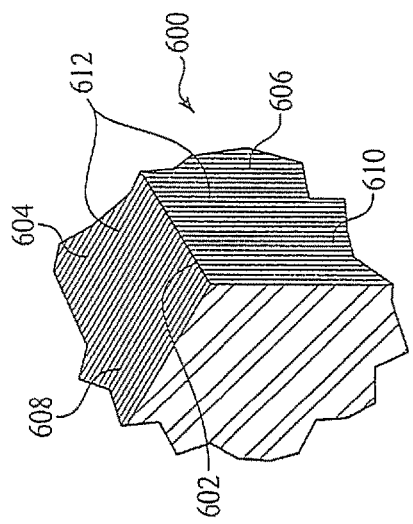
FIG. 10 shows a partial perspective view of a knife edge having a cutting surface disposed between surfaces of faces or face/outside diameter, all surfaces with surface finish marks substantially perpendicular to the cutting surface according to an embodiment of the invention.

FIG. 10 shows a knife edge 600 of a metal shearing knife according to an embodiment of the invention. Knife edge 600 has a cutting surface 602 disposed between two surfaces 604, 606. The surfaces 604, 606 are portions of a first face/outside diameter 608 and a second face 610. Surfaces 604, 602, 606 have surface finish marks 612 substantially perpendicular to the cutting surface 602 according to an embodiment of the invention.

Figure 11:
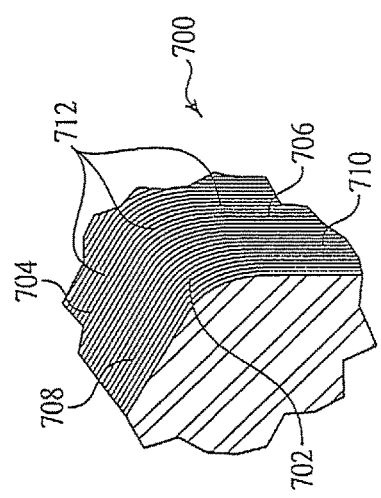
FIG. 11 shows a partial perspective view of a knife edge having a radiused cutting surface disposed between surfaces of faces or face/outside diameter, all surfaces with surface finish marks substantially perpendicular to the edge according to an embodiment of the invention.

FIG. 11 shows a knife edge 700 of a metal shearing knife according to an embodiment of the invention. Knife edge 700 has a radiused cutting surface 702 disposed between two surfaces 704, 706. Surfaces 704, 706 are portions of a first face/outside diameter 708 and a second face 710. Surfaces 704, 702, 706 have surface finish marks 712 substantially perpendicular to the radiused cutting surface 702 according to an embodiment of the invention.

Figure 12:
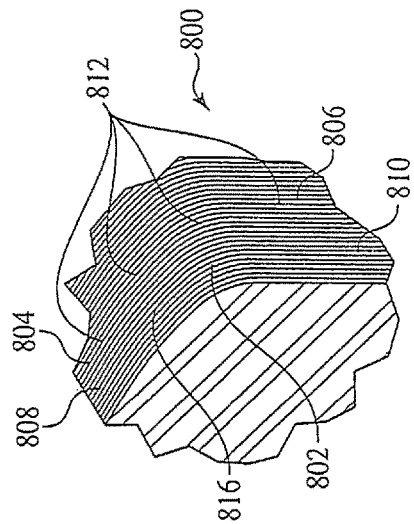
FIG. 12 shows a partial perspective view of a rotary knife edge having a curved profile surface on a face/outside diameter, a radiused cutting surface and surfaces of faces or face/outside diameter, all surfaces with surface finish marks substantially perpendicular to the cutting surface according to an embodiment of the invention.

FIG. 12 shows a knife edge 800 of a metal shearing knife according to an embodiment of the invention. Knife edge 800 has a curved profile surface 816 and a radiused cutting surface 802 disposed between two surfaces 804, 806. Surfaces 804, 806 are portions of a first face/outside diameter 808 and a second face 810. Surfaces 804, 816, 802, 806 have surface finish marks 812 substantially perpendicular to the cutting surface 802 according to an embodiment of the invention.

With reference to FIGS. 9-12, one feature includes a substantial absence of surface finish marks that are substantially parallel with the cutting surface, on surfaces adjacent to the cutting surface and on the cutting surface. Substantially parallel refers to at an angle of less than 10°. Substantial absence of surface finish marks is permitting an insignificant number of finish marks that do not affect the invention, particularly, the fatigue life. Even small residual grinding finish "crevices" or machined finish tool mark "valleys" that are substantially parallel with the cutting surface and which are not substantially eliminated from each surface adjacent to the cutting surface, generally reduce the improvement of fatigue life of the knife by being points from which fatigue fractures originate and propagate. According to embodiments of the invention, the width of the band on each surface adjacent to the cutting surface, in which virtually all of the undesirable direction finish marks must be removed has been found to be at least approximately 75% of the thickest metal to be sheared. "Virtually all removed," "absence of finish marks," "removed," "not completely eliminated" all refer to what can be observed thru a microscope of approximately 40× magnification.

It has been found on field test knives which have residual undesirable direction marks near the cutting surface, that fatigue fractures originated from these residual marks and propagated along them to cause the knife edge to fail earlier than when there was a visual absence of residual undesirable marks.

With reference to FIGS. 9-12, a feature includes direction of surface finish marks on surfaces adjacent to, and on, the cutting surface of the edge. According to embodiments of the invention, it has been found that surface finish marks which are substantially perpendicular to the cutting surface are not sites from which fatigue fractures originate, regardless of the surface finish roughness. A direction perpendicular to the cutting surface, or an isotropic finish (no direction), is the extreme that is best; a direction parallel with the cutting surface is the extreme that is worst. The preferred surface finish roughness is <0.6 micron Ra.

With reference to FIG. 11, a feature includes a radius on the cutting surface. According to embodiments of the invention, it has been found that the larger the radius size, the higher the effectiveness of increasing the fatigue life of the edge. However, the largest radius on the cutting surface that may be used is limited by the need to avoid undesirable side effects of: (1) excess burr on the sheared edge of the metal being sheared, and (2) reduction of wear life. Rather than being related to the highest strength metal being sheared, the limit of maximum size radius on the cutting surface is related to the lowest yield strength and thinnest thickness of all the metals that are expected to be sheared by the knife. Empirical limits of the maximum size radius on the cutting surface for lower strength steels, in the range of approximately 200 to 300 MPa yield strength, to avoid undesirable burr, have been determined to be approximately the values in the following table which shows a range of 0.05 mm to 0.3 mm.

| thinnest low strength steel to be sheared (mm) | approximate maximum edge radius (mm) |
|---|---|
| 10 | 0.3 |
| 6 | 0.2 |
| 2 | 0.1 |
| 1 | 0.05 |

With reference to FIG. 12, a feature includes a curved profile surface from face or outside diameter to radiused cutting surface. A curved profile surface is defined herein as including straight surfaces as well as curved surfaces which "drop," reduce in height, or have a negative slope as they approach the cutting surface of the edge. According to embodiments of the invention, the degree of curved profile surface "drop" from the face surface or outside diameter of the knife that contacts the surface of the metal being sheared to the cutting surface is a smooth convex curve and, not stepped or concave. Tests showed that fatigue life was negatively affected if the profile drop dimension was low or zero. Test knives with the extreme of virtually no profile drop had lower fatigue life than those with larger amounts of profile drop. In all of the empirical testing, no negative effects of too much profile drop have been observed. Larger amounts of drop should distribute shearing forces more widely and away from the cutting surface and reduce maximum peak stress in the knife edge, increasing fatigue life According to an embodiment of the invention, the preferred profile is a function of the lowest yield strength, highest thickness metal that is expected to be sheared by the knife, i.e. a profile that will not mark the metal surface or plastically deform the metal. One range of profile drop dimension is 0.01 mm<0.025 mm over the width of a band with a width of approximately 75% of the thickest metal to be sheared.

Each individual feature has been found to be effective for increasing the fatigue life of knife edges when shearing higher strength metals. Testing of knife edges according to embodiments of the invention has resulted in fatigue life factors of improvement of at least 130%, and, as shown below, 200% to 450% over conventional, prior art types of knife edges when shearing higher strength steels. Based on embodiments of the invention, the fatigue life factors of improvement can be magnitudes higher than 200% to 450%.

As shown in the following table, using abbreviations:
PAKE=Prior Art Knife Edges
IKE=Invention Knife Edges (knife edges according to an embodiment of the invention)
Different steel mills record length of run in different units:
MFT=million feet of lineal coil length
km=kilometers of lineal coil length
coil=flat rolled steel, typically about 2,200 lineal feet/coil

| Test # (site.run) | Summary | Life of PAKE (Prior Art Knife Edges) | Life of IKE (Invention Knife Edges) | Factor of Increased Fatigue Life (X equals times) |
|---|---|---|---|---|
| A.1 | (2) new Invention Knife Edges (IKE) ran simultaneously against (2) new Prior Art Knife Edges (PAKE). PAKE were conventional production knives/edges used by this test site. First (2) PAKE failed; IKE continued to run without failing while (8) additional replacement PAKE (some new & some reconditioned) failed before the (2) IKE failed. | first (2) failed at 0.31 MFT, then (8) more PAKE failed | 1.42 MFT | 4.5X |
| A.2 | (2) new IKE ran simultaneously against (2) new PAKE. First (2) PAKE failed; IKE continued to run without failing while (6) additional replacement PAKE (some new & some reconditioned) failed before first (2) IKE failed. | first (2) failed at 0.33 MFT, then (6) more PAKE failed | 1.15 MFT | >3.5X |
| A.3 | (2) reconditioned IKE ran simultaneously against (2) reconditioned PAKE. First (2) PAKE failed; IKE continued to run without failing while (6) other reconditioned replacement PAKE failed before first (2) IKE failed. | first (2) failed at 0.33 MFT, then (6) more PAKE failed | 1.01 MFT | 3.1X |

-continued

| Test # (site.run) | Summary | Life of PAKE (Prior Art Knife Edges) | Life of IKE (Invention Knife Edges) | Factor of Increased Fatigue Life (X equals times) |
|---|---|---|---|---|
| A.4 | (2) reconditioned IKE ran simultaneously against (2) reconditioned PAKE. First (2) PAKE failed; IKE continued to run without failing while (6) other reconditioned replacement PAKE failed before first (2) IKE failed. | first (2) failed at 123 coils (est. 0.27 MFT) | 368 coils (est. 0.81 MFT) | 3X |
| B.1 | (4) PAKE mushroomed after one revolution of knives, cutting 186 ksi steel. Reground those knives and modified to IKE. IKE edges in good condition after running (4) coils. | ~3 feet | (4) coils (est. 8,000 feet) | >>>4X |
| C.1 | (6) reconditioned IKE ran 26 coils of 0.395" K55 high strength pipe steel; prior to that, PAKE made to same material & hardness spec but without IKE would run 12-14 coils of this steel. | 12-14 coils | 26 coils | 2X |
| D.1 | (2) IKE ran simultaneously against (2) PAKE; the (4) were the same material and hardness specification and were made in the same production lot. After running 99 km of "90% hard coils", test was stopped due to failure of both PAKE. Both PAKE had fatigue cracks all around the edges and multiple fatigue spalls broken out of the edges. Neither of the IKE had any cracks or broken edges and appeared capable of easily running this amount or more, additionally. | 99 km stopped, removed (2) and inspected; continuous cracks all around and spoiled edge failures | 99 km stopped, removed (2) and inspected; NO cracks and NO failures | visual lack of cracks on IKE versus continuous cracks and failures on PAKE, estimated conservatively to be 2X to 4X |
| D.2 | (2) IKE ran simultaneously against (2) PAKE; the (4) were the same material and hardness specification and were made in the same production lot as test D.1. After running 194 km of "a diverse coil mix", test was stopped due to failure of both PAKE. Both PAKE had fatigue cracks all around the edges and multiple fatigue spalls broken out of the edges. Neither of the IKE had any cracks or broken edges and appeared capable of easily running this amount or more, additionally. | 194 km stopped, removed (2) and inspected; continuous cracks all around and spalled edge failures | 194 km stopped, removed (2) and inspected; NO cracks and NO failures | visual lack of cracks on IKE versus continuous cracks and failures on PAKE, estimated conservatively to be 2X to 4X |

With reference to FIGS. 13a to 14d, the significant increase of fatigue life is visually evident in magnified pictures of two knife edges according to embodiments of the invention run at the same time as two conventional knife edges, shearing the same coils of high strength steel, for the same length, 99 kilometers. The knives were manufactured in the same lot, from the same raw material, and processed the same, all made with conventional edges (like that shown in FIG. 1). One edge on each of the four knives was modified with features according to embodiments of the invention; the other edge of each of the four knives was not modified, remaining as conventional edges. The test ran until a sheared edge of the coil of steel showed unacceptable quality, at which time the test was stopped, all four knives were removed, and the conditions of the four knife edges was inspected and recorded by 40× magnification microscope pictures. In each of the pictures, the microscope is looking at the face of the knife, with the knife edge at the top of the picture, the curvature of the knife edge being the outside diameter of the rotary knife.

Figure 2:
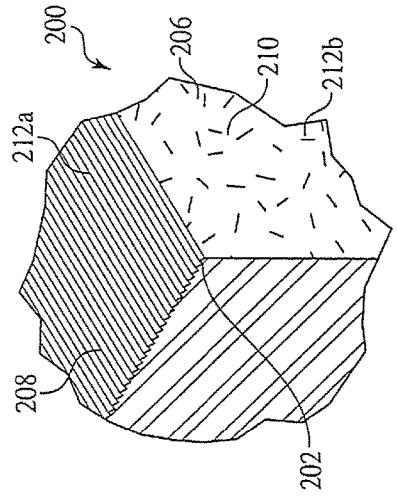
FIG. 2 shows a partial perspective view of a conventional rotary knife edge having an outside diameter with surface finish marks substantially parallel with the cutting surface and a lapped face with non-directional surface finish marks.
Figure 4:
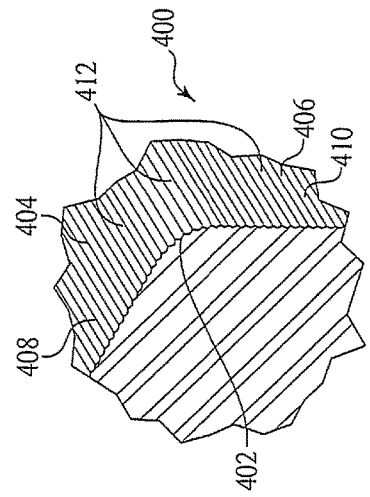
FIG. 4 shows a partial perspective view of a conventional rotary knife edge having a radius on the cutting surface and a single-point machined surface finish with surface finish marks substantially parallel with the cutting surface on the outside diameter, face, and cutting surface.
Figure 1:
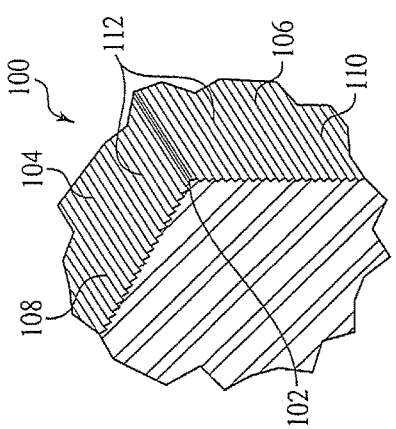
FIG. 1 shows a partial perspective view of a conventional knife edge having a ground surface finish with surface finish marks substantially parallel with the cutting surface.
Figure 3:
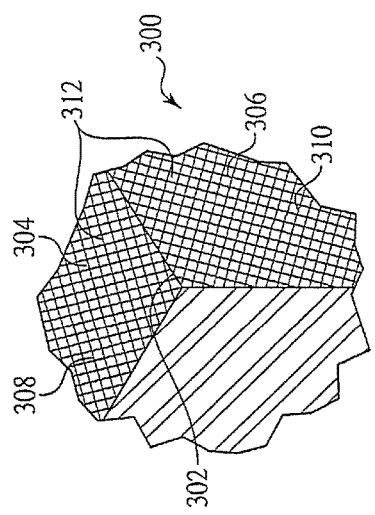
FIG. 3 shows a partial perspective view of a conventional straight knife edge having a vertical spindle or blanchard ground surface finish with surface finish marks at bias directions to the cutting surface.

FIGS. 13a and 13b are of the prior art knife edges of the type shown in FIG. 1, showing the best conditions found around the entire edges; cracks (arrows) of this size and larger were all around the edges.

FIGS. 13c and 13d are of the prior art knife edges of the type shown in FIG. 1, showing the worst conditions found around the entire edges; cracks (arrows) had propagated into the knife edges until pieces spalled out of the edges in several.

FIGS. 14a and 14b are of the knife edges according to an embodiment of the invention, showing the best conditions found around the entire edges. Note no cracks or spalls had developed in the edges.

FIGS. 14c and 14d show worst conditions found around the entire knife edges according to an embodiment of the invention. Note no cracks or spalls had developed in the edges.

The complete lack of any visible cracks in the knife edges according to an embodiment of the invention suggests they could have run significantly longer before developing fatigue cracks. Running the four knife edges (two conventional edges and two edges according to an embodiment of the invention) simultaneously to shear the same steel, and using knives manufactured in the same production lot from the same material, helped eliminate variables that might have affected the results. Thus, a reasonable conclusion is that the knife edges according to an embodiment of the invention were the sole factor providing the improvement.

Embodiments of the invention increase the fatigue life of metal shearing knives. In particular, and by reference to FIGS. 5a-8c, there are illustrated embodiments including knives having straight, rotary, curved and helical edges having edges with features according to embodiments of the invention. While the disclosed embodiments are drawn to metal shearing knives, it is understood that embodiments of the invention also include other types of knives as well. Embodiments of the invention in different types of knives are shown in reference to FIGS. 5a to 8c.

As shown in FIGS. 5a, 5b and 5c, straight knife 10 having a body 12 including four edges, at least one of which is an edge 14 (FIG. 5b), according to an embodiment of the invention, having a cutting surface disposed between a first face 16 and a second face 18. First face 16 contacts the metal being sheared.

As shown in FIGS. 6a, 6b and 6c, rotary knife 20 having a body 22 including two edges 24a, 24b (FIG. 6b), at least one of which is an edge, according to an embodiment of the invention, having a cutting surface disposed between an outside diameter 29 and a first face 26. Outside diameter 29 contacts the metal being sheared.

As shown in FIGS. 7a, 7b and 7c, curved knife 30 having a body 32 including four edges, at least one of which is an edge 34 (FIG. 7b), according to an embodiment of the invention, having a cutting surface disposed between a first face 36 and a second face 38. Second face 38 contacts the metal being sheared.

As shown in FIGS. 8a, 8b and 8c, helical knife 40 having a body 42 including an edge 44 (FIG. 8b), according to an embodiment of the invention, having a cutting surface disposed between a first face 46 and a second face 48. First face 46 contacts the metal being sheared.

A method of making a knife according to embodiments of the invention starts with procuring a knife without the features of the invention, with edge in the form of any of the forms illustrated in FIGS. 1-4.

For the finish feature, surface finish marks that are substantially parallel with the cutting surface are removed from a band of each surface adjacent to the cutting surface of the edge. The width of the band from the cutting surface is preferred to be at least a minimum of 75% of the maximum thickness of metals to be sheared; it may be wider. Existing surface finish marks are removed, creating a surface finish direction that is substantially perpendicular to the cutting surface, with a surface finish roughness less than 0.6 micron Ra. The surface finish roughness may be lower, i.e. polished, if preferred for appearance.

For the profile feature, a curved profile surface is created across the width of the band described above, on the face or outside diameter which will contact the metal being sheared. The amount of profile drop across the width of the band is described above. The form of the profile surface is convex with generally a radius or quarter ellipse "waterfall" form. The surface finish direction and roughness of the profile surface are as described above for the finish feature.

For the radius feature, a radius is created on the cutting surface. The size of the radius is described above. The surface finish direction and roughness of the radius surface are as described above for the finish feature.

Nothing in the above description is meant to limit the invention to any specific formulation, calculation, or methodology. Many formulation, calculation and methodology substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. A metal shearing tool comprising:
   a body;
   an edge of the body having a first surface and a second surface;
   a cutting surface disposed between the first surface and the second surface;
   wherein the edge has a convex curved profile, and wherein the edge further has a substantial absence of finish marks substantially parallel with the cutting surface.

2. The metal shearing tool of claim 1, wherein the edge farther has a radius.

3. The metal shearing tool according to any one of the preceding claims, wherein the metal shearing tool demonstrates improved fatigue life.

4. A metal shearing tool comprising:
   a body;
   an edge of the body having a first surface and a second surface;
   a cutting surface disposed between the first surface and the second surface;
   wherein the edge has at least one of a convex curved profile and a radius, and wherein the edge further has a substantial absence of finish marks substantially parallel with the cutting surface;
   wherein the metal shearing tool demonstrates improved fatigue life of at least 130% compared to the same metal shearing tool not having at least one of a convex curved profile, and a radius, and wherein the edge further has a substantial absence of finish marks substantially parallel with the cutting surface.

5. The metal shearing tool according to claim 4, wherein the metal shearing tool demonstrates improved fatigue life of at least 200% compared to the same metal shearing tool not having at least one of a convex curved profile and a radius, and wherein the edge further has a substantial absence of finish marks substantially parallel with the cutting surface.

6. The metal shearing tool according to claim 5, wherein the metal shearing tool demonstrates improved fatigue life of at least 450% compared to the same metal shearing tool not having at least one of a convex curved profile and a radius, and wherein the edge further has a substantial absence of finish marks substantially parallel with the cutting surface.

* * * * *